US010558339B1

(12) United States Patent
Pitelka

(10) Patent No.: US 10,558,339 B1
(45) Date of Patent: Feb. 11, 2020

(54) SYSTEM AND METHOD FOR ANALYZING ELECTRONIC COMMUNICATIONS AND A COLLABORATIVE ELECTRONIC COMMUNICATIONS USER INTERFACE

(71) Applicant: PALANTIR TECHNOLOGIES INC., Palo Alto, CA (US)

(72) Inventor: Hunter Pitelka, Arlington, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 297 days.

(21) Appl. No.: 15/257,125

(22) Filed: Sep. 6, 2016

Related U.S. Application Data

(60) Provisional application No. 62/217,264, filed on Sep. 11, 2015.

(51) Int. Cl.
*G06F 9/48* (2006.01)
*G06F 3/0484* (2013.01)
(Continued)

(52) U.S. Cl.
CPC ........ *G06F 3/04842* (2013.01); *G06F 3/0482* (2013.01); *G06F 16/245* (2019.01); *H04L 51/18* (2013.01)

(58) Field of Classification Search
CPC .............. G06F 3/04842; G06F 3/0482; G06F 17/30424; G06F 16/245; H04L 51/18
See application file for complete search history.

(56) References Cited

U.S. PATENT DOCUMENTS 5,418,950 A   5/1995   Li et al.
5,428,737 A   6/1995   Li et al.
(Continued)

FOREIGN PATENT DOCUMENTS

DE   102014103482   9/2014
EP   1647908        4/2006
(Continued)

OTHER PUBLICATIONS

"A Quick Guide to UniProtKB Swiss-Prot & TrEMBL," Sep. 2011, pp. 2.
(Continued)

*Primary Examiner* — Jennifer N To
*Assistant Examiner* — K C Chen
(74) *Attorney, Agent, or Firm* — Knobbe, Martens, Olson & Bear, LLP

(57) ABSTRACT

Systems and methods are disclosed for collaborative information analysis via electronic communications. In accordance with one implementation, a method is provided for analyzing electronic communications. The method includes, for example, receiving a selection of one of a plurality of electronic communication systems. Moreover, the method includes receiving, from the selected electronic communication system, an electronic communication comprising a plurality of terms and identifying at least one term of interest from the plurality of terms. The method further includes searching for information pertaining to the at least one term of interest and receiving information responsive to the search. The method also includes creating an object corresponding to the at least one term of interest and sharing a representation of the object with one or more users.

17 Claims, 8 Drawing Sheets

(51) Int. Cl.
*H04L 12/58* (2006.01)
*G06F 3/0482* (2013.01)
*G06F 16/245* (2019.01)

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,643,613 B2 | 11/2003 | McGee et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,378,526 B2 | 6/2016 | Sampson |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0111479 A1* | 6/2004 | Borden ............ G06Q 10/107 709/206 |
| 2004/0126840 A1 | 7/2004 | Cheng et al. |
| 2004/0139212 A1 | 7/2004 | Mukherjee et al. |
| 2004/0153837 A1 | 8/2004 | Preston et al. |
| 2004/0193608 A1 | 9/2004 | Gollapudi et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0209085 A1 | 9/2006 | Wong et al. |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2008/0271838 A1 | 11/2008 | Carro |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0228564 A1* | 9/2009 | Hamburg ............ G06Q 10/107 709/206 |
| 2009/0248721 A1 | 10/2009 | Burton et al. |
| 2009/0254840 A1* | 10/2009 | Churchill ............ G06F 3/0481 715/753 |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0161427 A1* | 6/2011 | Fortin .................. H04L 51/20 709/206 |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |

(56) References Cited

U.S. PATENT DOCUMENTS

| | | | |
|---|---|---|---|
| 2012/0159449 | A1 | 6/2012 | Arnold et al. |
| 2012/0173381 | A1 | 7/2012 | Smith |
| 2012/0174057 | A1 | 7/2012 | Narendra et al. |
| 2012/0188252 | A1 | 7/2012 | Law |
| 2012/0284719 | A1 | 11/2012 | Phan et al. |
| 2013/0024268 | A1 | 1/2013 | Manickavelu |
| 2013/0024731 | A1 | 1/2013 | Shochat et al. |
| 2013/0054551 | A1 | 2/2013 | Lange |
| 2013/0086482 | A1 | 4/2013 | Parsons |
| 2013/0096968 | A1 | 4/2013 | Van Pelt et al. |
| 2013/0198624 | A1 | 8/2013 | Aymeloglu et al. |
| 2013/0225212 | A1 | 8/2013 | Khan |
| 2013/0226944 | A1 | 8/2013 | Baid et al. |
| 2013/0232220 | A1 | 9/2013 | Sampson |
| 2014/0012886 | A1 | 1/2014 | Downing et al. |
| 2014/0074888 | A1 | 3/2014 | Potter et al. |
| 2014/0108074 | A1 | 4/2014 | Miller et al. |
| 2014/0115589 | A1 | 4/2014 | Marinelli, III et al. |
| 2014/0115610 | A1 | 4/2014 | Marinelli, III et al. |
| 2014/0214579 | A1 | 7/2014 | Shen et al. |
| 2014/0244388 | A1 | 8/2014 | Manouchehri et al. |
| 2014/0365923 | A1* | 12/2014 | Lee .................... G06F 3/017 715/758 |
| 2015/0112641 | A1 | 4/2015 | Faraj |
| 2015/0269030 | A1 | 9/2015 | Fisher et al. |
| 2016/0026923 | A1 | 1/2016 | Erenrich et al. |
| 2017/0034087 | A1* | 2/2017 | Borenstein .............. H04L 51/08 |

FOREIGN PATENT DOCUMENTS

| | | |
|---|---|---|
| EP | 2634745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2010 |

OTHER PUBLICATIONS

"A Tour of Pinboard," <http://pinboard.in/tour> as printed May 15, 2014 in 6 pages.
"The FASTA Program Package," fasta-36.3.4, Mar. 25, 2011, pp. 29.
"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.
Alur et al., "Chapter 2: IBM InfoSphere DataStage Stages," IBM InfoSphere DataStage Data Flow and Job Design, Jul. 1, 2008, pp. 35-137.
Anonymous, "Frequently Asked Questions about Office Binder 97," http://web.archive.org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276-286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51D55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep.Ê29-Oct. 3, 2008, pp. 16.

(56) References Cited

OTHER PUBLICATIONS

Stamos et al., "Remote Evaluation," Journal ACM Transactions on Programming Languages and Systems (TOPLAS) vol. 12, Issue 4, Oct. 1990, pp. 537-564.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 14, 1996, pp. 219-231.
Notice of Allowance for U.S. Appl. No. 14/254,773 dated Aug. 20, 2014.
Notice of Allowance for U.S. Appl. No. 14/254,757 dated Sep. 10, 2014.
Notice of Allowance for U.S. Appl. No. 13/767,779 dated Mar. 17, 2015.
Notice of Allowance for U.S. Appl. No. 14/304,741 dated Apr. 7, 2015.
Notice of Allowance for U.S. Appl. No. 14/581,902 dated Nov. 13, 2015.
Notice of Allowance for U.S. Appl. No. 13/657,635 dated Jan. 29, 2016.
Notice of Allowance for U.S. Appl. No. 14/019,534 dated Feb. 4, 2016.
Notice of Allowance for U.S. Appl. No. 13/827,627 dated Apr. 11, 2016.
Notice of Allowance for U.S. Appl. No. 13/411,291 dated Apr. 22, 2016.
Notice of Allowance for U.S. Appl. No. 13/657,656 dated May 10, 2016.
Notice of Allowance for U.S. Appl. No. 15/066,970 dated Jun. 29, 2016.
Official Communication for U.S. Appl. No. 14/304,741 dated Aug. 6, 2014.
Official Communication for U.S. Appl. No. 13/657,656 dated Oct. 7, 2014.
Official Communication for U.S. Appl. No. 13/827,627 dated Mar. 2, 2015.
Official Communication for U.S. Appl. No. 14/304,741 dated Mar. 3, 2015.
Official Communication for U.S. Appl. No. 13/831,791 dated Mar. 4, 2015.
Official Communication for U.S. Appl. No. 13/608,864 dated Mar. 17, 2015.
Official Communication for U.S. Appl. No. 13/657,635 dated Mar. 30, 2015.
Official Communication for U.S. Appl. No. 13/657,656 dated May 6, 2015.
Official Communication for U.S. Appl. No. 13/608,864 dated Jun. 8, 2015.
Official Communication for U.S. Appl. No. 13/411,291 dated Jul. 15, 2015.
Official Communication for U.S. Appl. No. 14/019,534 dated Jul. 20, 2015.
Official Communication for U.S. Appl. No. 13/831,791 dated Aug. 6, 2015.
Official Communication for U.S. Appl. No. 13/827,627 dated Aug. 26, 2015.
Official Communication for U.S. Appl. No. 14/019,534 dated Sep. 4, 2015.
Official Communication for U.S. Appl. No. 13/411,291 dated Oct. 1, 2015.
Official Communication for U.S. Appl. No. 14/025,653 dated Oct. 6, 2015.
Official Communication for U.S. Appl. No. 14/134,558 dated Oct. 7, 2015.
Official Communication for U.S. Appl. No. 13/657,635 dated Oct. 7, 2015.
Official Communication for U.S. Appl. No. 13/827,627 dated Oct. 20, 2015.
Official Communication for U.S. Appl. No. 13/827,627 dated Dec. 22, 2015.
Official Communication for U.S. Appl. 14/025,653 dated Mar. 3, 2016.
Official Communication for U.S. Appl. No. 14/877,229 dated Mar. 22, 2016.
Official Communication for U.S. Appl. No. 14/134,558 dated May 16, 2016.
Official Communication for U.S. Appl. No. 14/134,558 dated Aug. 26, 2016.
Official Communication for Australian Patent Application No. 2013237710 dated Jan. 16, 2015.
Official Communication for Australian Patent Application No. 2013237658 dated Feb. 2, 2015.
Official Communication for Australian Patent Application No. 2014201580 dated Feb. 27, 2015.
Official Communication for Canadian Patent Application No. 2807899 dated Oct. 24, 2014.
Official Communication for Canadian Patent Application No. 2828264 dated Apr. 28, 2015.
Official Communication for Canadian Patent Application No. 2829266 dated Apr. 28, 2015.
Official Communication for Canadian Patent Application No. 2807899 dated Jul. 20, 2015.
Official Communication for Canadian Patent Application No. 2829266 dated Apr. 1, 2016.
Official Communication for Canadian Patent Application No. 2828264 dated Apr. 11, 2016.
Official Communication for European Patent Application No. 14159175.0 dated Jul. 17, 2014.
Official Communication for European Patent Application No. 14159629.6 dated Jul. 31, 2014.
Official Communication for European Patent Application No. 14159629.6 dated Sep. 22, 2014.
Official Communication for European Patent Application No. 15159520.4 dated Jul. 15, 2015.
Official Communication for European Patent Application No. 13157474.1 dated Oct. 30, 2015.
Official Communication for European Patent Application No. 14159175.0 dated Feb. 4, 2016.
Official Communication for European Patent Application No. 14159464.8 dated Feb. 18, 2016.
Official Communication for European Patent Application No. 13157474.1 dated Apr. 29, 2016.
Official Communication for German Patent Application No. 10 2013 221 057.4 dated Mar. 23, 2015.
Official Communication for German Patent Application No. 10 2013 221 052.3 dated Mar. 24, 2015.
Official Communication for Great Britain Patent Application No. 1404574.4 dated Dec. 18, 2014.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012437 dated Sep. 18, 2015.
Notice of Acceptance for New Zealand Patent Application No. 622485 dated Nov. 24, 2014.
Notice of Acceptance for New Zealand Patent Application No. 616212 dated Jan. 23, 2015.
Notice of Acceptance for New Zealand Patent Application No. 616299 dated Apr. 7, 2015.
Official Communication for New Zealand Patent Application No. 622414 dated Mar. 24, 2014.
Official Communication for New Zealand Patent Application No. 622484 dated Apr. 2, 2014.
Official Communication for New Zealand Patent Application No. 622485 dated Nov. 21, 2014.
Official Communication for New Zealand Patent Application No. 616299 dated Jan. 26, 2015.

\* cited by examiner

US 10,558,339 B1

SYSTEM AND METHOD FOR ANALYZING ELECTRONIC COMMUNICATIONS AND A COLLABORATIVE ELECTRONIC COMMUNICATIONS USER INTERFACE

REFERENCE TO RELATED APPLICATION

This application claims the benefit of priority to U.S. Provisional Patent Application No. 62/217,264, filed on Sep. 11, 2015, the disclosure of which is expressly incorporated herein by reference in its entirety.

BACKGROUND

Electronic communications, such as instant messaging, text messaging, e-mail, and chat, allows users quickly to exchange information in various forms, including text, images, audio, and video. For example, electronic communications is often used among friends and acquaintances to coordinate dinner plans or share media. In addition, businesses and other organizations use electronic communications for various purposes including, for example, to schedule meetings and share information among co-workers.

There are numerous applications and tools associated with electronic communications. They can be used to perform one or more tasks. For example, a student or employee may prepare a presentation using a document processing application and coordinate with team members regarding the format or content of the presentation using electronic communications. As a further example, a social media application may allow a user to upload and share photos and other information when travelling abroad.

Current solutions, however, do not efficiently integrate electronic communications systems with one another or with other applications to facilitate collaboration and other activities among users. There is presently a need for improved systems and methods that better integrate electronic communication systems with one another, as well as with other applications and information sources, to allow users to more easily and intelligently share information and accomplish tasks.

BRIEF DESCRIPTION OF THE DRAWINGS

Reference will now be made to the accompanying drawings, which illustrate exemplary embodiments of the present disclosure. In the drawings.

DESCRIPTION OF EXEMPLARY EMBODIMENTS

Reference will now be made in detail to several exemplary embodiments of the present disclosure, including those illustrated in the accompanying drawings. Whenever possible, the same reference numbers will be used throughout the drawings to refer to the same or like parts.

Embodiments disclosed herein are directed to, among other things, computer-implemented systems and methods for collaborative information analysis via electronic communications. For example, the systems and methods can receive a selection of one of a plurality of electronic communication systems, receive, from the selected electronic communication system, an electronic communication comprising a plurality of terms, and identify at least one term of interest from the plurality of terms, The systems and methods can also search for information pertaining to the at least one term of interest, receiving information responsive to the search, create an object corresponding to the at least one term of interest, the object comprising the received information responsive to the search, and share a representation of the object with a plurality of users.

Figure 1:
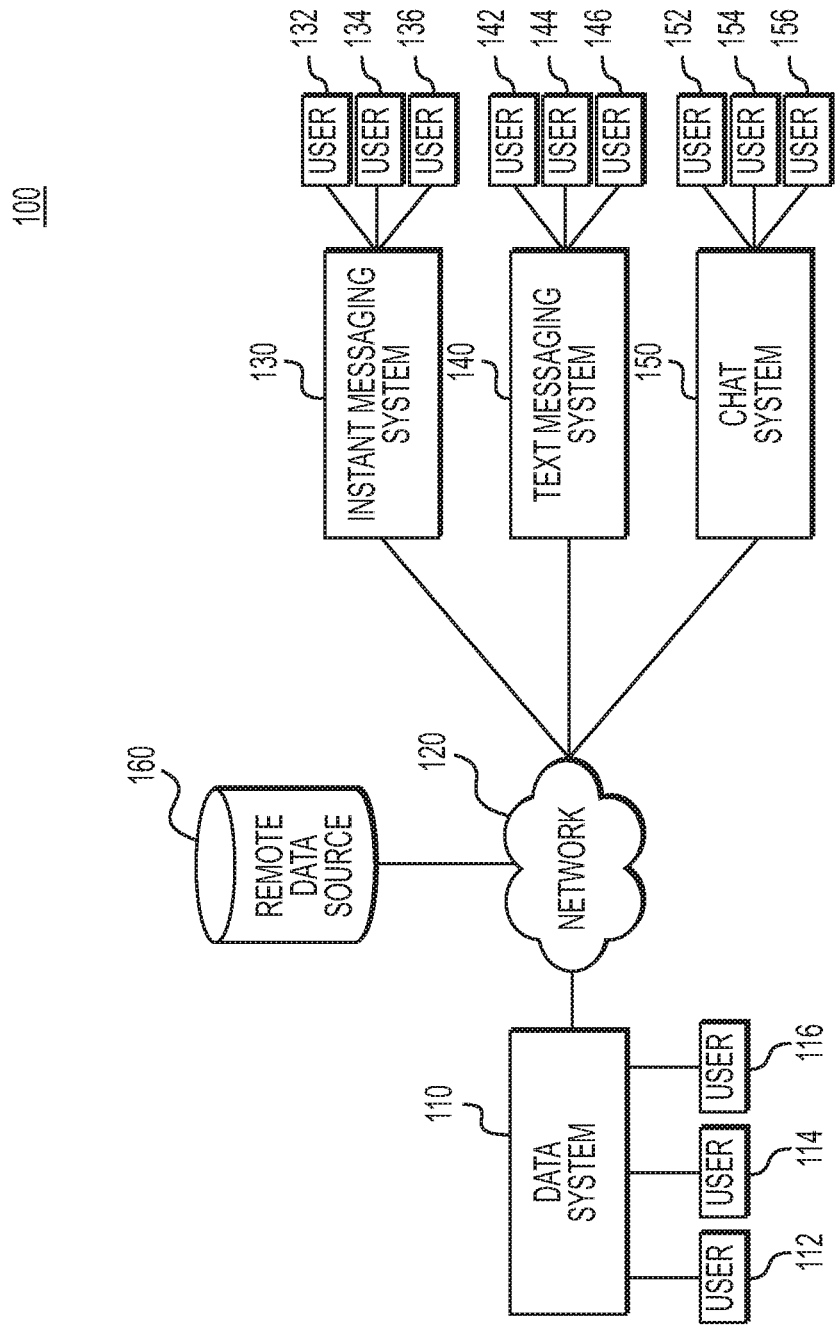
FIG. 1 illustrates an exemplary system for analyzing electronic communications, consistent with embodiments of the present disclosure.

FIG. 1 depicts an exemplary system 100 for analyzing electronic communications, in accordance with certain embodiments. In some embodiments, the components of FIG. 1 can be implemented by electronic device 210, which is further described below with reference to FIG. 2.

As shown in FIG. 1, system 100 may include a data system 110 in communication with remote data sources 160 and one or more electronic communication systems, such as instant messaging system 130, text messaging system 140, and chat system 150. The above components can communicated with one another over a network 120 (e.g., the Internet). In one embodiment, users (e.g., users 112-116) of data system 110 may receive communications over network 120 from users (e.g., users 132-136, 142-146, 152-156) of instant messaging system 130, text messaging system 140, and chat system 150. Data system 110 may analyze the received communications to identify terms of interest, such as terms that correspond to geographic locations (e.g., an address), people (e.g., a name), and/or events. In one embodiment, a user of data system 110 may search for information pertaining to the identified terms by submitting a request over network 120 to remote data sources 160. Data system 110 can receive information responsive to the search.

In one embodiment, data system 110 is utilized to create an object corresponding to the term. For example, the user may create a geographic location object corresponding to an address identified in an electronic communication. The object may also comprise information received responsive to the search. For example, the user may search remote data sources 160 for known businesses or persons associated with the geographic location and associate this information with the geographic location object. In one embodiment, other information may be stored with the object, such as a source user, a source messaging system, and a timestamp associated with an electronic communication. A user of data system 110 can share the object with a user of instant messaging system 130, text messaging system 140, or chat system 150, by sending a copy of the object or representation of the object to the user via network 120. Such representations may be in various forms, such as in text and/or graphical form. In addition, such objects may be shared by providing a link or accessible storage location. Accordingly, system 100 enables a user of data system 110 to receive communications regarding geographic locations, people, events, or other items of interest via various electronic messaging systems, extract pertinent information from those communications, collect additional information pertaining to those items from other sources, and share information regarding the items of interest with others via the various electronic messaging systems.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

Figure 2:
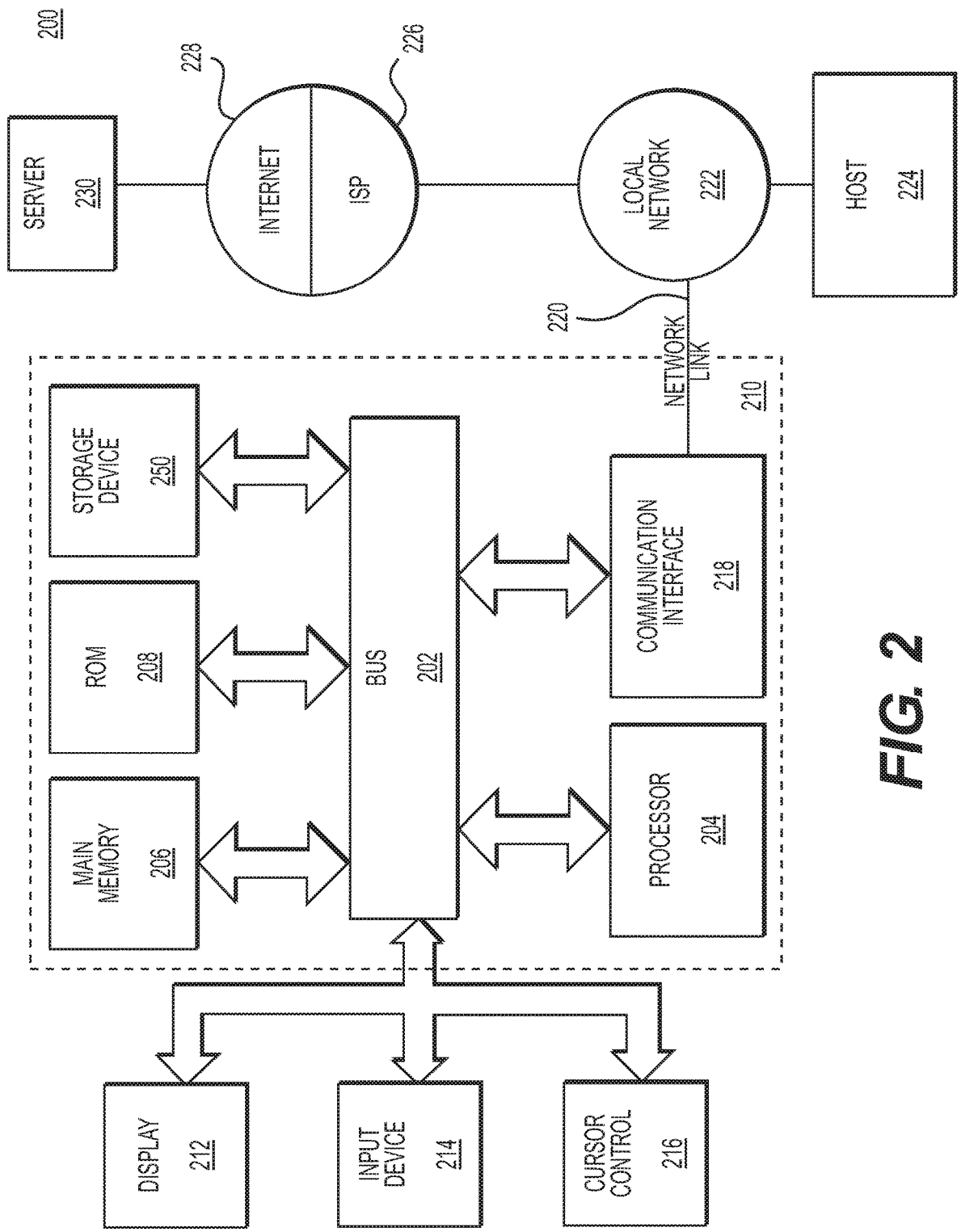
FIG. 2 is a block diagram of an exemplary electronic device, consistent with embodiments of the present disclosure.

By way of example, FIG. 2 is a block diagram that illustrates an implementation of an electronic device 210, which, as described above, can comprise one or more electronic devices. Electronic device 210 includes a bus 202 or other communication mechanism for communicating information, and one or more hardware processors 204, coupled with bus 202 for processing information. One or more hardware processors 204 can be, for example, one or more microprocessors.

Electronic device 210 also includes a main memory 206, such as a random access memory (RAM) or other dynamic storage device, coupled to bus 202 for storing information and instructions to be executed by processor 204. Main memory 206 also can be used for storing temporary variables or other intermediate information during execution of instructions to be executed by processor 204. Such instructions, when stored in non-transitory storage media accessible to one or more processors 204, render electronic device 210 into a special-purpose machine that is customized to perform the operations specified in the instructions.

Electronic device 210 further includes a read only memory (ROM) 208 or other static storage device coupled to bus 202 for storing static information and instructions for processor 204. A storage device 250, such as a magnetic disk, optical disk, or USB thumb drive (Flash drive), etc., is provided and coupled to bus 202 for storing information and instructions.

Electronic device 210 can be coupled via bus 202 to a display 212, such as a cathode ray tube (CRT), an LCD display, or a touchscreen, for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 210 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 210 can implement the techniques and other features described herein using customized hard-wired logic, one or more ASICs or FPGAs, firmware and/or program logic which in combination with the electronic device causes or programs electronic device 210 to be a special-purpose machine. According to some embodiments, the techniques and other features described herein are performed by electronic device 210 in response to one or more processors 204 executing one or more sequences of one or more instructions contained in main memory 206. Such instructions can be read into main memory 206 from another storage medium, such as storage device 250. Execution of the sequences of instructions contained in main memory 206 causes processor 204 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 250. Volatile media includes dynamic memory, such as main memory 206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media can be involved in carrying one or more sequences of one or more instructions to processor 204 for execution. For example, the instructions can initially be carried on a magnetic disk or solid state drive of a remote computer. The remote computer can load the instructions into its dynamic memory and send the instructions over a telephone line using a modem. A modem local to electronic device 210 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 can optionally be stored on storage device 250 either before or after execution by processor 204.

Electronic device 210 also includes a communication interface 218 coupled to bus 202. Communication interface 218 provides a two-way data communication coupling to a network link 220 that is connected to a local network 222. For example, communication interface 218 can be an integrated services digital network (ISDN) card, cable modem, satellite modem, or a modem to provide a data communication connection to a corresponding type of telephone line. As another example, communication interface 218 can be a local area network (LAN) card to provide a data communication connection to a compatible LAN. Wireless links can also be implemented. In any such implementation, communication interface 218 sends and receives electrical, electromagnetic or optical signals that carry digital data streams representing various types of information.

Network link 220 typically provides data communication through one or more networks to other data devices. For example, network link 220 can provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from electronic device 210, are example forms of transmission media.

Electronic device 210 can send messages and receive data, including program code, through the network(s), network link 220 and communication interface 218. In the Internet example, a server 230 might transmit a requested code for an application program through Internet 228, ISP 226, local network 222 and communication interface 218.

The received code can be executed by processor 204 as it is received, and/or stored in storage device 250, or other non-volatile storage for later execution.

Figure 3A:
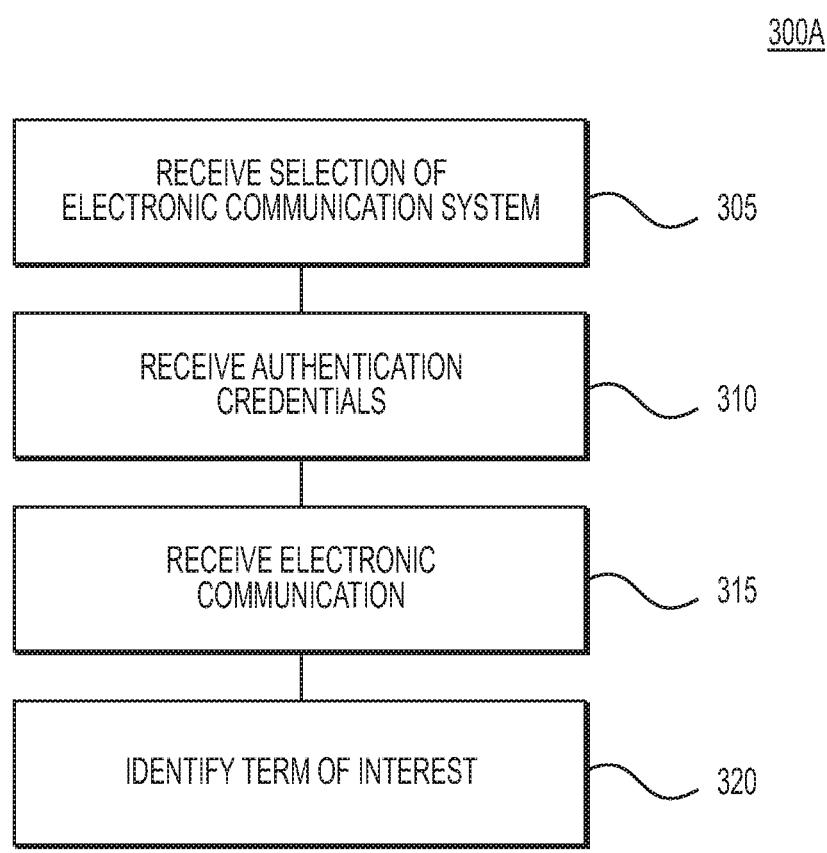
FIGS. 3A and 3B are flowcharts of exemplary methods for analyzing electronic communications, consistent with embodiments of the present disclosure.
Figure 3B:
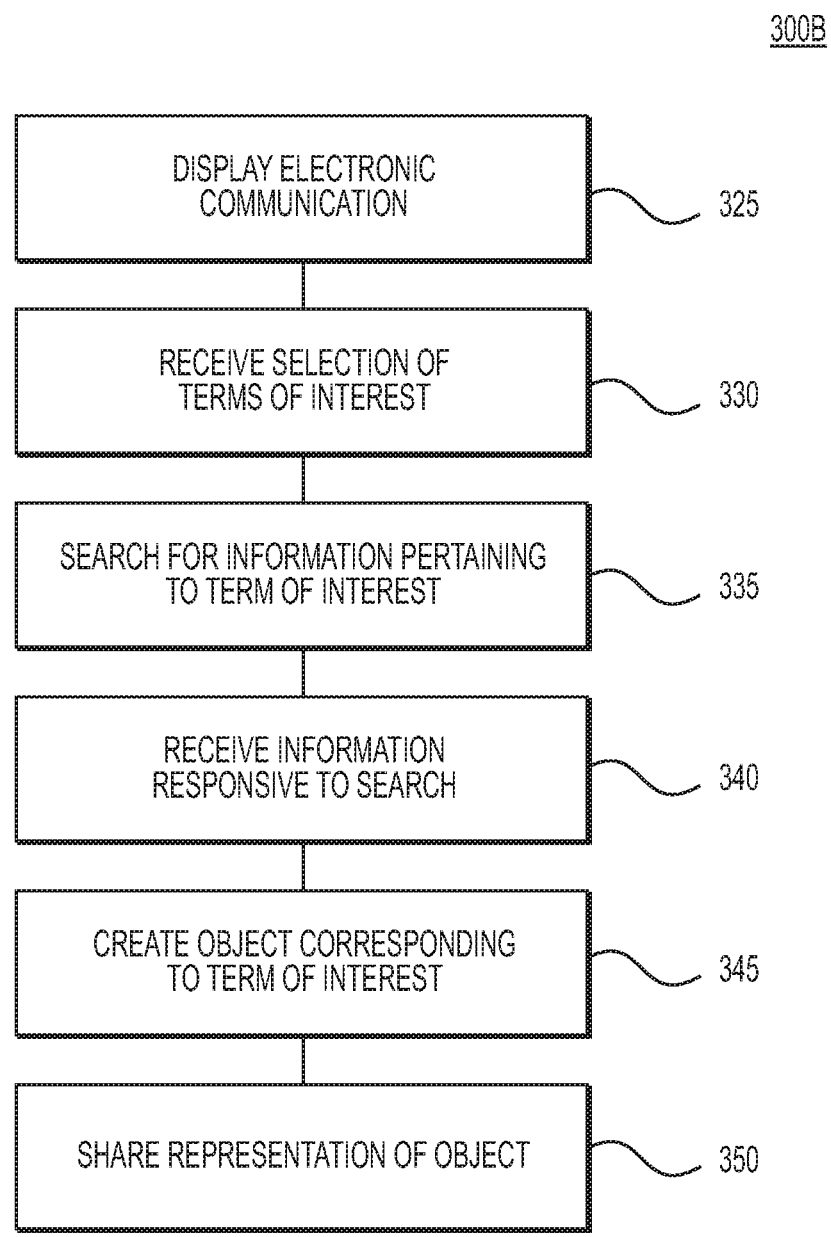

FIGS. 3A and 3B show flowcharts of exemplary methods 300A and 300B for analyzing electronic communications. In some embodiments, methods 300A and 300B can be performed by a client application (e.g., a web browser, a plug-in to a web browser, a standalone executable application, etc.) running on a client device, by a server (e.g., a web server), or it can have some steps or parts thereof executed on the client device, and some steps or parts thereof executed on the server. Thus, methods 300A and 300B can be performed by one or more electronic devices, such as electronic device 210. And while methods 300A and 300B, and the other following embodiments described herein, can be performed by multiple electronic devices each having one or more processors, for purposes of simplicity and without limitation, these embodiments will be explained with respect to a single electronic device (e.g., electronic device 210). While the flowcharts of FIGS. 3A and 3B illustrate steps in a particular order, it is appreciated that at least some of the steps can be moved, modified, or deleted where appropriate, consistent with the teachings of the present disclosure.

Referring to FIG. 3A, at step 305, the electronic device can receive a selection of one of a plurality of electronic communication systems. For example, the user may select an instant messaging system, text messaging system, e-mail system or chat system (i.e., chat room). In one embodiment, the user may communicate with other users on the same local area network using an internal or corporate electronic messaging system. Alternatively, the user may communicate over the Internet with other users using an externally hosted electronic communication system.

At step 310, the electronic device can receive authentication credentials from a user for the selected electronic communication system. For example, the user may provide a user name and password for the selected electronic communication system. The electronic device can transmit the authentication credentials to the selected electronic communication system, so that the user may be authenticated for access to the system.

If the user is authenticated by an electronic communication system, then the electronic device can display a user interface for the system to the user. The user may use this interface to exchange communications with other users of the system. In one embodiment, if the user logs into and is authenticated by multiple electronic communication systems, then the electronic device can display an interface for each electronic communication system to the user. For example, the electronic device can display a tabbed interface wherein each tab represents a different electronic communication system. In another embodiment, the electronic device can display a tabbed interface wherein each tab represents a different conversation between the user of the electronic device and another user. In this embodiment, the tabs can represent conversations between the user and other users across the same or different electronic communication systems. In still another embodiment, communications received from multiple users across one or more electronic communication systems can be displayed within the same window or interface. For example, incoming and outgoing communications can be displayed in sequence according to when they are received or sent, irrespective of the source user or source electronic communication system.

At step 315, the electronic device can receive an electronic communication comprising a plurality of terms. For example, the electronic device can receive an instant message, text message, e-mail, or chat transmitted from another user on an internal network (e.g., a corporate LAN) or external network (e.g., the Internet). In one embodiment, the electronic device can subscribe to and/or monitor one or more chat rooms and, thus, receive any chats that are exchanged among users of the chat room(s). In an alternate embodiment, a dedicated server or other device separate from the electronic device can subscribe to and/or monitor the one or more chat rooms and send all or select chats to the electronic device. For example, a dedicated server or other device may monitor a chat room for communications containing certain terms and forward any communications containing those terms to the electronic device. In addition to chat rooms, embodiments of the present disclosure also may be applied to other forms of communication, such an group messaging and chat or e-mail streams.

At step 320, the electronic device can identify at least one term of interest from the plurality of terms. In one embodiment, the electronic device can parse the communication or plurality of terms into separate terms and analyze each of the terms separately and/or in combination. For example, the electronic device can parse the electronic communication into n-grams containing n characters per term or parse the electronic communication into terms based on spacing (e.g., each space denotes a separation of two terms). In one embodiment, at least one term of interest may be identified from the plurality of terms by applying one or more regular expressions to the plurality of terms collectively, each term separately, or one or more subsets of the plurality of terms in combination.

In one embodiment, the at least one term of interest describes a geographic location. The geographic location may comprise (or be identified by) latitude and longitude coordinates, an address, and/or a monument or landmark. Thus, according to certain embodiments, identifying at least one term of interest from the plurality of terms may include analyzing the plurality of terms to identify a geographic location. The electronic device can analyze the plurality of terms for certain patterns that may indicate a geographic location. For example, the electronic device can detect a street address if the plurality of terms includes a street suffix (e.g., Road, Rd., Street, St., Avenue, Ave.), zip code, and/or other aspects of a street address, whether alone or in combination. The electronic device can identify latitude and longitude coordinates, if an electronic communication includes two numbers, one of which is in the range −90 to +90 and the other of which is in the range −180 to +180. The electronic device can also identify a monument, landmark, or address by comparing each term in the plurality of terms to one or more dictionaries comprising popular monuments, landmarks, and/or street names.

In one embodiment, the at least one term of interest is a name of a person. The electronic device can analyze the plurality of terms for certain patterns indicative of a person's name. For example, the electronic device can detect a person's name if the plurality of terms includes two consecutive terms that both begin with a capital letter. The electronic device can also detect a person's name if the plurality of terms includes a name prefix (e.g., Mr., Mrs., Dr.) or name suffix, such as a generational title (e.g., Jr., Sr., III) or professional styling (e.g., Esq., Ph.D). The electronic device can also detect a person's name by comparing each term in the plurality of terms to one or more dictionaries comprising common first and/or last names and/or names of select persons of interest.

In one embodiment, the at least one term of interest is an event. For example, an electronic communication among police officers may be received providing information regarding a recent theft or burglary. By way of example, the term "theft" may be identified from the electronic communication as a term of interest. In one embodiment, an event may be associated with other terms of interest, such as geographic locations and persons. For example, a theft event may be associated with a geographic location at which the theft occurred and a person suspected of committing the theft.

Referring to FIG. 3B, at step 325, the electronic device can display the electronic communication. For example, the electronic device can display the electronic communication with other electronic communications in a window or other user interface element directed to the display of instant messages, text messages, e-mails, and/or chats. Each received electronic communication may be displayed, for example, in a tab associated with a particular electronic communication system or user, as discussed above. Alternatively, the received electronic communication may be displayed along with other electronic messages from various users and through various electronic communication systems.

In one embodiment, the electronic device displays the electronic communication along with data associated with the communication. For example, the electronic device can display a source user and timestamp along with (e.g., preceding) the text of the electronic communication. In one embodiment, the at least one term of interest is highlighted and selectable. The formatting of the at least one term of interest may be different from the formatting of the other terms in the electronic communication. For example, the at least one term of interest may be displayed in a different color, font, size, or style (e.g., bold, underline, italics) than the other terms in the electronic communication. In one embodiment, the at least one term of interest is selectable by a user. For example, a user may interact with the at least one term of interest by placing a cursor over the term (e.g., mouseover) or clicking the term.

At step 330, the electronic device can receive a selection of the at least one term of interest. In one embodiment, the electronic device can perform an action in response to a user placing a cursor over (e.g., mouseover) the at least one term of interest. For example, if a user places a cursor over a term in the electronic communication that describes a geographic location, the electronic device can display the geographic location on a map. In one embodiment, the electronic device can perform an action in response to a user clicking the at least one term of interest. For example, the electronic device can initiate the process of creating a new object based on the at least one term in response to a user clicking the at least one term, such as by displaying a new window or dialog box enabling the user to enter information describing the object.

At step 335, the electronic device can search for information pertaining to the at least one term of interest. For example, a user of the electronic device may search for information pertaining to a term by querying a data system or local database associated with the electronic device or sending a request over a network (e.g., the Internet) to a remote data source. The user may also search for more information pertaining to a term by sending requests for more information to users of electronic communication systems. For example, the user of the electronic device may receive an instant message from a source user that indicates suspicious activity at a geographic location. As another example, the user may query other users in a chat room regarding any activities or persons known to be associated with the geographic location or area where the activity is identified.

At step 340, the electronic device can receive information responsive to the search. For example, the electronic device can receive information regarding a term in response to a data system or local database query. Alternatively, the electronic device can receive information regarding the term from a remote data source. The electronic device can also receive information regarding the term from a user of an electronic communication system.

At step 345, the electronic device can create an object corresponding to the at least one term of interest. For example, the electronic device can create a representation of a geographic location, person, or event identified by the at least one term of interest, such that the user (and other users) can store and share information regarding the geographic location, person, or event. In one embodiment, the object comprises data describing the source of the electronic communication, a timestamp identifying when the electronic communication was received, and the at least one term of interest. In one embodiment, the electronic device can extract data from the electronic communication and store the data with the text of the communication in an object. For example, the electronic device can determine the type of electronic communication (e.g., instant message, text message, e-mail, or chat), the electronic communication system from which the electronic message was received (e.g., AOL Instant Messenger, Facebook Messenger), the user from which the electronic message was received, and the time when the electronic communication was received and store this information in an object along with the content (i.e., the plurality of terms) of the electronic communication. The electronic device can also determine whether the object is associated with a geographic location, person, event, or other object type and designate the object as being associated with the determined type.

Additional information may be extracted from the electronic communication or requested from a user based on the object type. For example, if the object type is a geographic location, the latitude and longitude coordinates, street address, or monument or landmark name may be extracted from the electronic communication and stored in one or more fields associated with the object. If the object type is a person, then the person's name may be extracted from the electronic communication and stored in a name field associated with the object. In one embodiment, the electronic device can receive additional information associated with the object. For example, the electronic device can search a local or remote database (e.g., dictionary) for additional information regarding a geographic location or person and store this information along with the information extracted from the electronic communication. This additional information may include, for example, pictures and activities associated with a geographic location or person, a birthdate, social security number, driver's license number associated with a person, or any other information that may be associated with a geographic location or person.

In one embodiment, the electronic device can display a user interface element, such as a new object creation interface, to the user upon receiving a selection of the at least one term of interest. The dialog box may contain input boxes for various fields associated with the object corresponding to the at least one term of interest. In one embodiment, fields associated with information that was extracted from the electronic communication (e.g., a source messaging system, a source user, and/or a timestamp) may be automatically populated in the interface. The user may edit this information and add new information regarding the object, such as the information received in step 340, by inputting the information into the appropriate fields of the interface. Once the user has entered new information and/or confirmed existing information pertaining to the object, the electronic device can store the information (e.g., in a database).

In one embodiment, the electronic device can create and store an object corresponding to an event. An event may be associated with a series of electronic communications, geographic locations, persons, and/or other information. Accordingly, an event object may be associated with one or more other objects, such as one or more geographic location objects and/or person objects. For example, a user may receive a communication regarding an ongoing bank robbery, including an address associated with the bank and a name of a suspect (i.e., person suspected of committing the robbery). The user may search a local or remote database for information pertaining to the suspect (e.g., appearance) and store this information in an object. The user may then share the object with another user (e.g., a police officer), who may use the information in the object to locate the subject. Each of these communications and associated objects (e.g., bank object and suspect object) may be associated with a bank robbery event object.

At step 350, the electronic device can share a representation of the object. In one embodiment, the electronic device can share a representation of the object by sending a second electronic communication including the object. For example, a user of the electronic device can identify another user to whom the object should be sent and send an electronic communication to that user including a copy of the object in native form (i.e., the form in which the object is originally stored by the electronic device). In another embodiment, the electronic device can share a representation of the object by sending a second electronic communication. The second electronic communication may include, for example, text and/or graphical representation(s) of the object. For example, the electronic device can convert the object from its native form to a text representation of the object and send the text representation of the object as an attachment to a message sent to another user or as the content of the message. In one embodiment, the text representation of the object includes field names and content for each of the fields associated with the object.

In one embodiment, the electronic device determines whether to send a copy of the object in native form or a text representation of the object based on the recipient of the object. For example, if the electronic device associated with the recipient of the object is located on the same local network (e.g., corporate LAN) as the sending electronic device, the sending electronic device can send a copy of the object in native form because the recipient electronic device is likely to have the same capabilities for viewing the object as the sending electronic device. If the electronic device associated with the recipient of the object is located on a remote network, the sending electronic device can send a text representation of the object to ensure that the recipient user is able to view the object information. In still other embodiments, sharing of an object with other users may be achieved by sending a link or otherwise providing access to the object at a stored location.

In one embodiment, a user may browse a database to select an object to share with another user. In another embodiment, the user may use a cursor to drag an icon associated with the object into a new or existing messaging interface to share the object with one or more other users. For example, the user may drag a representation of an object (e.g., icon) associated with a geographic location from a map into a messaging interface to send the object (or a text representation thereof) to another user.

In one embodiment, the electronic device can share the information currently being displayed on its screen with another electronic device. For example, the electronic device can share a display associated with the electronic device, the display comprising a map associated with the at least one selected term and an electronic message comprising the at least one selected term. In one embodiment, the electronic device can capture the information currently being displayed on the screen (e.g., in a screen shot) and send an image with this information to another device. In another embodiment, the sending electronic device can stream the information currently being displayed on its screen to a recipient electronic device, such that a user of the recipient electronic device can monitor the actions that are occurring on the sending electronic device.

In one embodiment, the electronic device can record events associated with a communication session. For example, a user may select a record button to record the information that is displayed on the screen during a communication session, such that the user (or another user) may later analyze the flow of communications, the identification or persons or geographic locations on a map, the creation of new objects based on the communications, and the sharing of new and existing objects.

Figure 4:
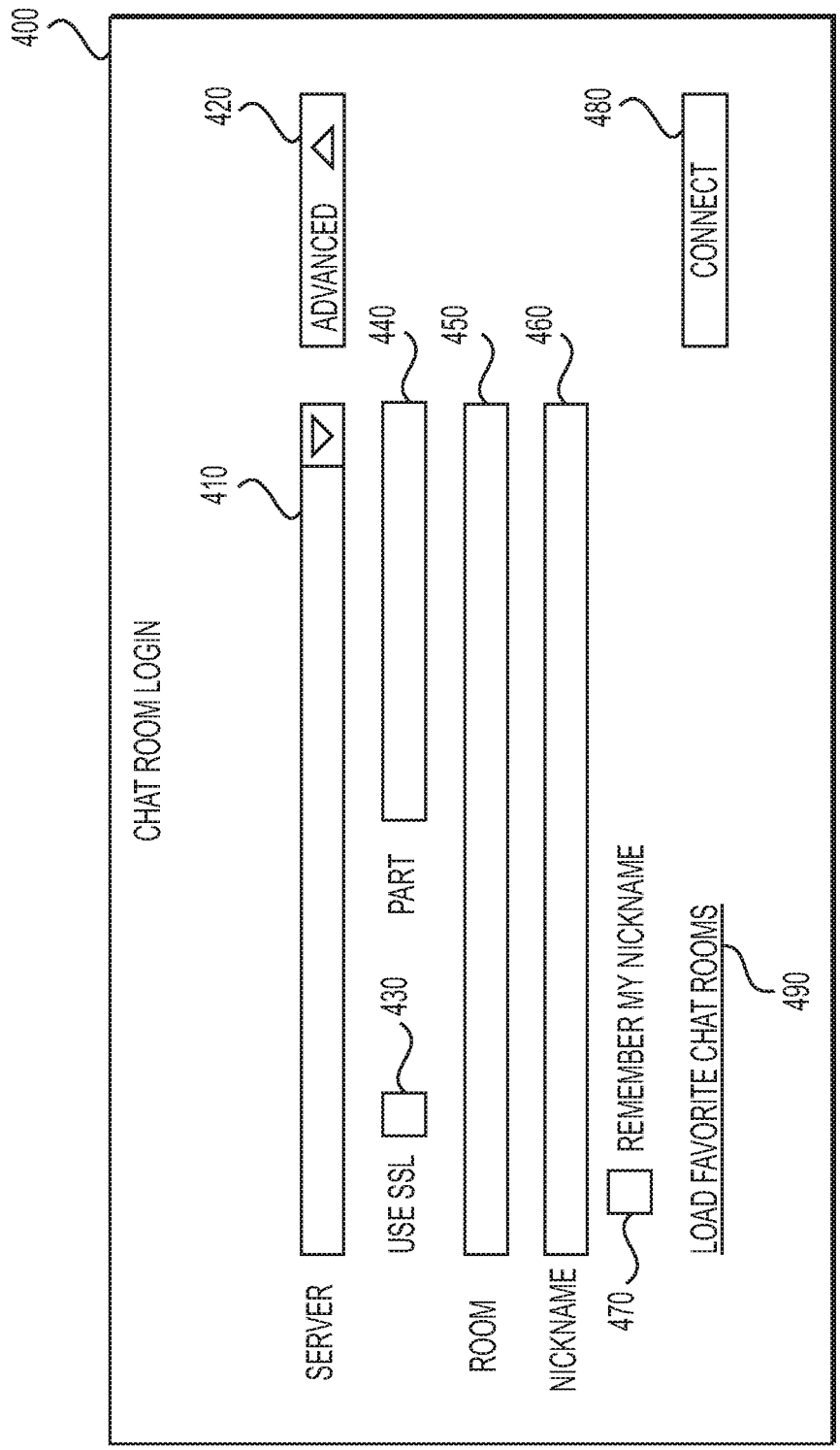
FIG. 4 illustrates an exemplary login interface, consistent with embodiments of the present disclosure.

FIG. 4 illustrates an exemplary electronic messaging login interface 400 provided by the electronic device (e.g., electronic device 210) for display (e.g., display 212) in accordance with some embodiments. Interface 400 can be used by a user to log into an electronic messaging system, such as a chat room, instant messaging system, or text messaging system. In one embodiment, interface 400 is displayed in messaging window 510 shown in FIG. 5. In an alternate embodiment, interface 400 is displayed in a separate window, which enables a user to access the functionality of interface 500 of FIG. 5 upon login.

As shown in FIG. 4, interface 400 includes several input fields for enabling a user to log into an electronic communication system. A user may input the server that hosts an electronic communication session in server input box 410. The user may gain access to advanced options for logging into the server specified by server input box 410 by selecting advanced options button 420. In one embodiment, the advanced options can include using secure sockets layer (SSL) for communications with the server and providing a port number through which to communicate with the server. Accordingly, if advanced options button 420 is selected, the user may select to use SSL by selecting SSL option box 430. Moreover, the user may input the port number to use for communications with the server in port input box 440.

The user may indicate a chat room that the user wishes to enter or monitor using room input box 450. In one embodiment, if room input box 450 is left blank, then the electronic device can display (e.g., in a separate popup window) a listing of all eligible chat rooms to the user for selection. Alternatively, the user may select favorite chat room link 490 to view a window containing a listing of the user's favorite chat rooms.

The user may specify a nickname to be associated with the user during the electronic messaging session using nickname input box 460. If the user selects the remember nickname checkbox 470, the electronic device will store the nickname input by the user into nickname input box 460 in memory and prepopulate nickname input box 460 with that nickname during future login attempts by the electronic device with the specified server. Once the user has specified the appropriate server, chat room, and any other desired options (e.g., advanced options or nickname), the electronic device will contact the server to log the user into an electronic messaging session in the specified chat room.

While the exemplary interface 400 shown in FIG. 4 is intended primarily for use in connection with a chat room, one of ordinary skill in the art would understand that minor modifications could be made to provide appropriate options for logging into an instant messaging system or text messaging system. For example, an input box may be provided for a password to authenticate the user with the messaging system. Further, certain components shown in FIG. 4 (e.g., room input box 450 and favorite chat room link 490) may be omitted from a login interface for an instant messaging system or text messaging system.

Figure 5:
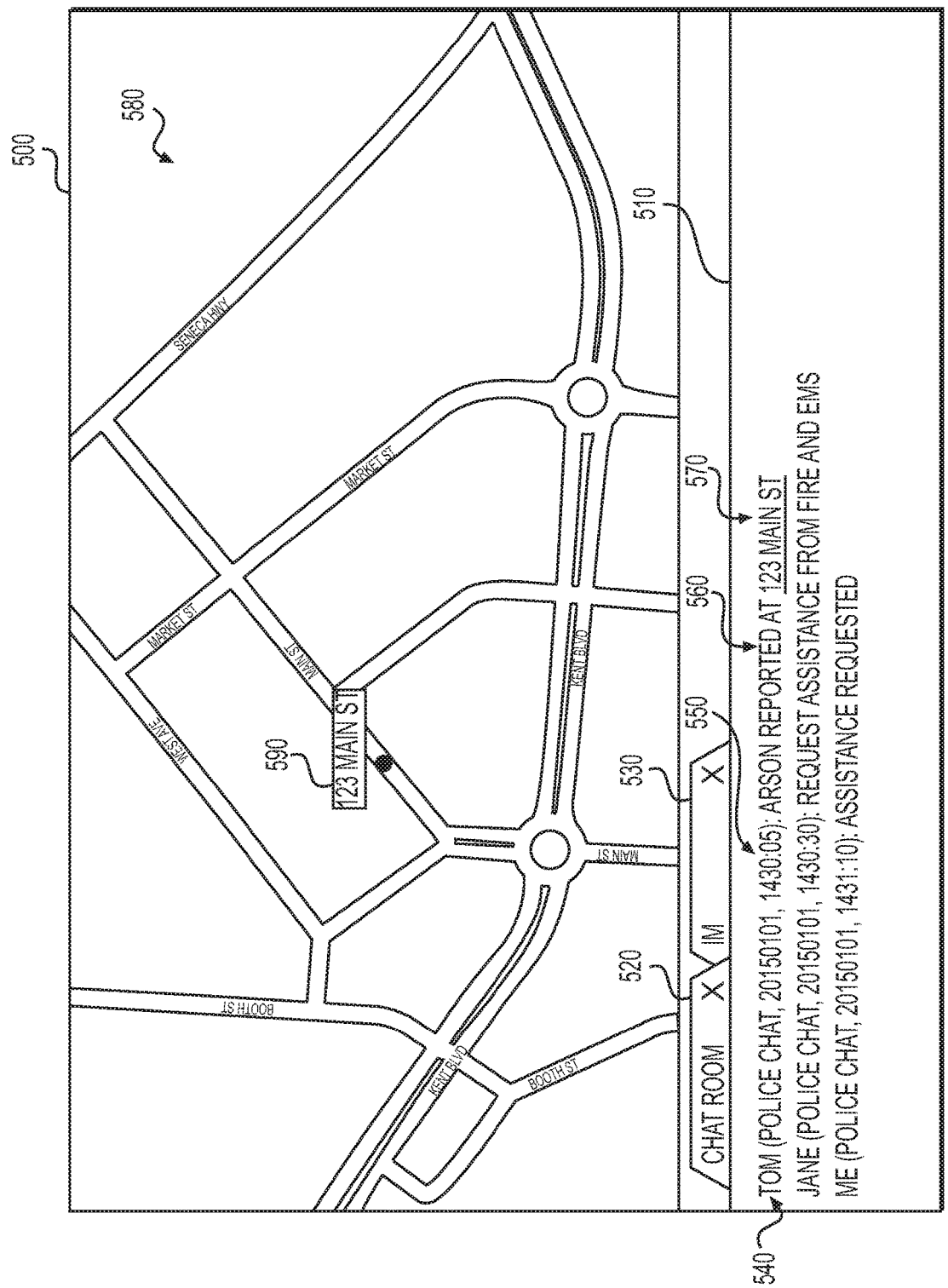
FIG. 5 illustrates an exemplary messaging interface, consistent with embodiments of the present disclosure.

FIG. 5 illustrates an exemplary messaging interface 500 provided by the electronic device (e.g., electronic device 210) for display (e.g., display 212) in accordance with some embodiments. Interface 500 can be used by a user to exchange electronic messages with other users and visualize information associated with the electronic messages.

As shown in FIG. 5, interface 500 includes an electronic messaging window 510 to facilitate exchange of electronic messages. Electronic messaging window 510 may include one or more tabs, such as chat room tab 520 and instant message tab 530, to facilitate navigation between different electronic messaging sessions. In one embodiment, the user may log into an electronic communication system using electronic messaging login interface 400. As discussed above, the input boxes provided to a user in interface 400 may differ based on whether the tab corresponds to a chat room, instant messaging system, or text messaging system.

In one embodiment, electronic messaging window 510 may initially include only one tab. When the electronic device first loads and displays messaging interface 500, the initial tab may displayed in electronic messaging window 510 may display a messaging login interface 400. In one embodiment, a user may set a default messaging type, such as chat room, instant messaging, or text messaging, and the interface 400 displayed in electronic messaging window 510 at startup will correspond to the login interface appropriate for the default messaging type. In one embodiment the user may login to additional electronic communication systems by opening a new tab in electronic messaging window 510. For example, the user may right-click on an existing tab and select a "New Chat," "New IM," or "New Text" option to open a new tab that may facilitate login and exchange of messages via another electronic communication system.

In one embodiment, each tab in electronic messaging window 510 may correspond to a different electronic communication system, such as a different chat room, instant messaging system, or text messaging system. In another embodiment, each tab in electronic messaging window 510 may correspond to a specific exchange between the user of the electronic device and another user. For example, the user may exchange messages with three different users of the same electronic messaging system via three separate tabs—one for each messaging session with each user.

Electronic messaging window 510 displays messages exchanged among users via an electronic communication system. In one embodiment, electronic messaging window 510 may display a source 540, timestamp 550, and message content, including standard text 560 and terms of interest 570. In one embodiment, source 540 may indicate the source user who sent the message. In another embodiment, source 540 may indicate the source electronic communication system for the message (e.g., where the electronic messaging window displays messages from multiple electronic communication systems consolidated into one tab). In yet another embodiment, source 540 may indicate both the source electronic communication system and the source user for the message. Timestamp 550 may indicate the date and/or time the message was sent.

Each displayed message also includes the content of the message. The message content may include standard text 560 and/or at least one term of interest 570. The at least one term of interest 570 may be identified as described above with respect to step 320 of FIG. 3A. In one embodiment, the at least one term of interest 570 is displayed in a different font, color, or style (e.g., bold, italics, underline) from standard text 560 to indicate that the term is a term of interest and to suggest to the user that the term is selectable (e.g., via a mouseover or mouseclick action). If the user selects the at least one term of interest 570, the electronic device can create a new object corresponding to the at least one term of interest 570, as described above with respect to step 345 of FIG. 3B.

Information analysis interface 500 may also include a map display area 580. In one embodiment, map display area 580 may indicate the geographic locations corresponding to the at least one term of interest identified in electronic messaging window 510. For example, if the user moves a cursor over a term of interest corresponding to a geographic location (e.g., latitude/longitude coordinates, street address, landmark/monument), an indication 590 of the geographic location may be displayed in map display area 580. In one embodiment, if the user moves a cursor over a term of interest corresponding to a person who is associated with one or more geographic locations (e.g., home, work, current location), an indication 590 of each geographic location associated with that person may be displayed in map display area 580. In one embodiment, the user may select the indication 590 to open a window displaying additional information associated with the object represented by the indication (e.g., the person and/or geographic location). In one embodiment, the user may drag the indication 590 from the map display area 580 to an active electronic messaging session in electronic messaging window 510 to share the object associated with indication 590 with the other user(s) participating in the displayed electronic messaging session.

Figure 6:
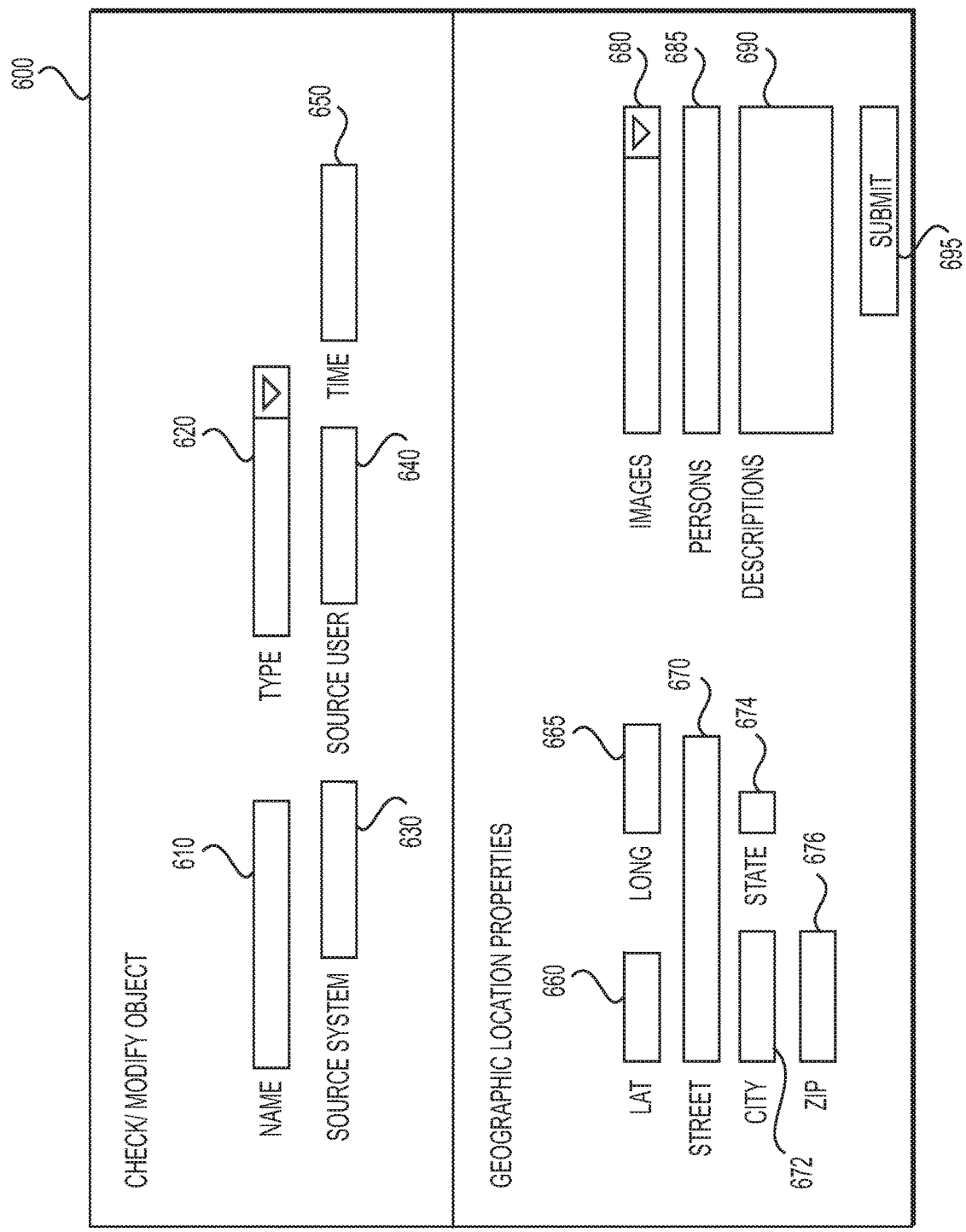
FIG. 6 illustrates an exemplary object creation interface, consistent with embodiments of the present disclosure.

FIG. 6 illustrates an exemplary object creation interface 600 provided by the electronic device (e.g., electronic device 210) for display (e.g., display 212) in accordance with some embodiments. Interface 600 may be used by a user to create and/or modify objects. For example, interface 600 may be used to create a new object corresponding to a term of interest 570 selected by a user from electronic messaging window 510 of FIG. 5. In one embodiment, interface 600 may also be used to modify previously created objects.

Interface 600 may include various input boxes corresponding to fields that may be associated with an object. In one embodiment, interface 600 includes at least a name input box 610, type input box 620, source system input box 630, source user input box 640, and timestamp input box 650. A user may specify a name to associate with the object using name input box 610. The user may associate the object with an object type using type input box 620. For example, the user may indicate that the object is a geographic location or a person using type input box 620. The user may indicate the source electronic communication system and source user corresponding to a message associated with the object using source system input box 630 and source user input box 640. For example, if a user selects a term of interest from an instant message received from Alice on AOL Instant Messenger, then the source system input box 630 should identify AOL Instant Messenger as the source system and the source user input box 640 should identify Alice as the source user. The user may identify the time at which the messaging including the term of interest using timestamp input box 650.

In one embodiment, the remaining input boxes displayed in interface 600 may be determined dynamically based on the user's selection of an object type in type input box 620. For example, interface 600 may display one set of input boxes for a geographic location and a different set of input boxes for a person. The exemplary object creation interface 600 shown in FIG. 6 corresponds to an interface for creating a new object of type geographic location. As shown in FIG. 6, interface 600 may provide several input fields for describing a geographic location, including latitude and longitude input boxes 660 and 665, street address input boxes 670-676, images input box 680, associated person input box 685, and description input box 690. Alternate or additional input boxes may be provided for geographic locations and other object types, as would be understood by one of ordinary skill in the art. For example, a new object interface for entering information for a new person object may include input boxes for birthdate, social security number, driver's license number, residential address, employer, etc.

A user may associate a geographic location with latitude and longitude coordinates by inputting those coordinates into latitude input box 660 and longitude input box 665. The user may indicate a street address, city, state, and zip code for a geographic location using street address input boxes 670, 672, 674, and 676, respectively. The user may also upload one or more images to be associated with the geographic location using images input box 680. Moreover, the user may identify one or more persons associated with the geographic location using associated person input box 685. In one embodiment, if information regarding a person identified in associated person input box 685 is stored in the electronic device as an object, that object may be associated with the geographic location object. The user may enter a description of the geographic location, or provide any other comments that the user wishes to associate with the geographic location, using description input box 690. The user may store the information input into input boxes 610-690 by selecting submit button 695.

In one embodiment, the electronic device can prepopulate some of the input boxes of interface 600. For example, if a user selects a term of interest from an electronic message, the electronic device can extract the source electronic messaging system, source user, and timestamp from the electronic message and prepopulate source system input box 630, source user input box 640, and timestamp input box 650, respectively, with these values. The electronic device can also prepopulate other input boxes using information from the electronic message or elsewhere. In one embodiment, the electronic device can prepopulate type input box 620 with the object type based on the content of the at least one term of interest. For example, if the term of interest was identified as being of interest based on a determination that the term corresponds to a geographic location, then the object type is determined to be geographic location, and this identification is prepopulated in type input box 620. The electronic device can also prepopulate the latitude and longitude input boxes 660 and 665 or street address input boxes 670-676 with latitude/longitude information or street address information, if the selected term of interest includes latitude/longitude information or street address information. In one embodiment, the electronic device can prevent the user from modifying information in one or more of the prepopulated input boxes. For example, the electronic device can prevent the user from modifying the source system, source user, and time stamp associated with an object. In one embodiment, one or more of the prepopulated input boxes may be modified by a user.

Figure 7:
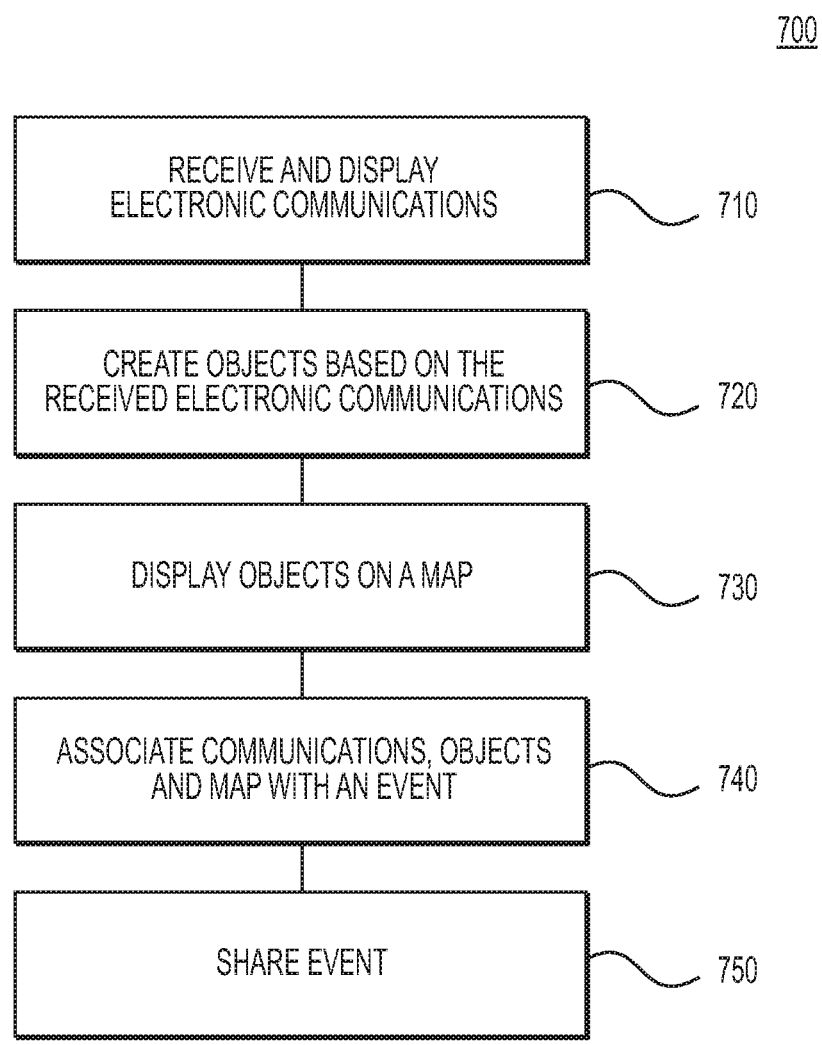
FIG. 7 is a flowchart of another exemplary method for analyzing electronic communications, consistent with embodiments of the present disclosure.

FIG. 7 shows a flowchart of another exemplary method 700 for analyzing electronic communications. In some embodiments, method 700 can be performed by a client application (e.g., a web browser, a plug-in to a web browser, a standalone executable application, etc.) running on a client device, by a server (e.g., a web server), or it can have some steps or parts thereof executed on the client device, and some steps or parts thereof executed on the server. Thus, method 700 can be performed by one or more electronic devices, such as electronic device 210. And while method 700 and the other following embodiments described herein can be performed by multiple electronic devices each having one or more processors, for purposes of simplicity and without limitation, these embodiments will be explained with respect to a single electronic device (e.g., electronic device 210). While the flowchart discloses the following steps in a particular order, it is appreciated that at least some of the steps can be moved, modified, or deleted where appropriate, consistent with the teachings of the present disclosure.

Referring to FIG. 7, at step 710, the electronic device can receive and display electronic communications. For example, the electronic device can receive electronic communications from one or more instant messaging systems, text messaging systems, and chat systems over a network (e.g., the Internet) and display them in an electronic messaging window (e.g., electronic messaging window 510). The electronic device may analyze the received electronic communications to identify terms of interest, such as geographic locations, persons, and events. In one embodiment, the electronic device highlights the identified terms of interest, such as by displaying the identified terms of interest in a different font, style, or color.

At step 720, the electronic device can create objects based on the received electronic communications. In one embodiment, the electronic device creates objects corresponding to the identified terms of interest. For example, the electronic device can create an object corresponding to a geographic location, person, or event in response to a user selection of a term corresponding to the geographic location, person, or event. In one embodiment, the user may provide information for the object using an object creation interface, such as object creation interface 600.

At step 730, the electronic device can display the created objects on a map. For example, the electronic device may display an indication of one or more locations associated with each object on a map. In one embodiment, the indication may include an object name, which may correspond, for example, to a name or address associated with a geographic location or a name of a person.

At step 740, the electronic device can associate one or more of the received communications, created objects, and the map with an event. For example, the received communications may pertain to a bank robbery event. In this example, a user may receive a communication from one user via an instant messaging system reporting that a bank robbery has occurred, including a geographic location associated with a bank and a name of a person of interest. The user may communicate with other users in a chat room to share the information received regarding the bank robbery and receive updates on the location of the person of interest. The user may also search a remote database to locate more information regarding the person of interest and share this information with the source user via instant message or with the other users of the chat room. The user may create objects corresponding to the bank and the person of interest. The location of the bank and each reported location of the person of interest may be displayed on a map, as the location information is received. The communications exchanged regarding the bank robbery, the objects corresponding to the bank and person of interest, and the map may be associated with a bank robbery event object.

In one embodiment, the received communications, created objects, and map may be manually associated with an event by a user. For example, the user may select one or more communications, objects, and/or maps to associate with an event. In another embodiment, the received communications, created objects, and map may be automatically associated with an event. For example, the electronic device may associate all communications exchanged between two users during a certain timespan—and all objects and maps created based on those communications—with the same event.

At step 750, the electronic device can share the event. In one embodiment, the user of the electronic device may share the event with another user by sending a recording of the event to the other user via instant message, text message, or chat. For example, the electronic device can record the information displayed on the electronic device from the point at which the first electronic communication regarding the event is exchanged to the point at which the last electronic communication regarding the event is exchanged. Accordingly, the recording may enable the recipient to see the same information as was displayed to the user of the electronic device as the event occurred.

In an exemplary implementation, the disclosed embodiments may be used by emergency services personnel to share information regarding an ongoing emergency. For example, an analyst may log into one or more electronic communication systems to monitor communications pertaining to ongoing emergencies. For example, the analyst may use an electronic device to log into chat rooms and/or instant messaging systems associated with police departments, fire departments, and emergency medical services. Once authenticated, the electronic device can receive and analyze communications among users of those electronic messaging systems.

Upon receiving an electronic communication, the electronic device can identify one or more terms of interest. For example, the electronic device can receive and display an electronic communication sent to users of a chat room internal to a police department stating: "Arson reported at 123 Main Street." The electronic device can identify "123 Main Street" as a geographic location based on the term "Street," designate that term as a term of interest, and highlight the term by bolding it, underlining it, and displaying it in a different color from the remainder of the text in the electronic message.

The analyst may move a cursor over the highlighted term to cause the electronic device to display the location associated with the term on a map. The analyst may click on the term to create an object based on the term. The electronic device can extract information from the electronic message, such as the source system (i.e., police chat room), source user, and timestamp, along with the text of the communication and the identification of the term of interest. The electronic device can also display a popup window with the extracted information preloaded, such that the user may confirm the extracted information. The user may also enter and/or upload additional information about the geographic location, such as one or more images of the location, by interacting with the popup window. Once the user has finished entering the information about the term of interest in the popup window, the user may click a submit button to cause the electronic device to store the information in memory.

The analyst may share the new object with emergency services personnel. For example, the user may drag a representation of the object from the map into a chat room window associated with a fire department, so that the fire department may dispatch personnel to put out the fire. The user may also send an instant message comprising the new object to firefighters or emergency medical services personnel who are driving to the scene of the arson. If the instant message is associated with a remote network or a receiving device that has limited display capabilities, the electronic device can convert the object from its native format to a text representation and send the text representation of the object to ensure that the receiving user is able to view the information.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. An electronic device comprising:
   one or more computer-readable storage media configured to store instructions; and
   one or more processors configured to execute the instructions to configure the one or more processors to:
   monitor electronic communications between a plurality of users within an electronic communication system, wherein said monitoring includes:
      accessing, from the electronic communication system, a first electronic communication from a first user, the first electronic communication comprising a plurality of terms;
      searching the plurality of terms for matches to one or more of a plurality of terms of interest;
      identifying in the plurality of terms at least one of the terms of interest;
      requesting, from a data source, information pertaining to the identified at least one term of interest; and
      receiving information responsive to the request;
   cause presentation of an electronic communication user interface comprising:
      a first textual representation comprising the at least one term of interest, wherein the at least one term of interest is selectable to further present a dialog associated with creation of an object, wherein the dialog includes one or more input fields configured to receive information associated with the term of interest; and
      a second textual representation of a second electronic communication from a second user;
   create a first object corresponding to a first of the at least one term of interest, the first object comprising the received information and the information provided via the dialog of the electronic communication user interface associated with the first term of interest; and
   provide the first object to a second user computing device, wherein the first object comprises data describing a source of the first electronic communication, a timestamp identifying when the first electronic communication was received, and the at least one term of interest.

2. The electronic device of claim 1, wherein the first electronic communication is of a type selected from an instant message, a text message, an e-mail, or a chat message.

3. The electronic device of claim 1, wherein to create the first object further comprises:
   extract data from the first electronic communication; and
   add the data to the first object.

4. The electronic device of claim 1, wherein to create the first object further comprises:
   determine an object type based at least in part on the at least one term of interest; and
   designate the first object as being associated with the object type.

5. The electronic device of claim 1, wherein the at least one term of interest is a geographic location.

6. The electronic device of claim 5, wherein the geographic location comprises at least one of latitude and longitude coordinates, an address, and a landmark.

7. The electronic device of claim 5, wherein the one or more processors are further configured to execute the instructions to cause the electronic device to display an indication of the geographic location on a map.

8. The electronic device of claim 1, wherein the one or more processors are configured to execute the instructions to cause the electronic device to share a representation of the first object by sending a third electronic communication including the first object.

9. The electronic device of claim 1, wherein the one or more processors are configured to execute the instructions to cause the electronic device to share a representation of the first object by sending a third electronic communication including at least one of a text or graphical representation of the first object.

10. The electronic device of claim 1, wherein the at least one term of interest is an event.

11. The electronic device of claim 1, wherein the one or more processors are configured to execute the instructions to share a display associated with the electronic device, the display comprising a map associated with a selected term of the at least one term of interest that is selectable and an electronic communication comprising the selected term.

12. A method comprising operations performed by one or more processors, the operations comprising:
  accessing, from an electronic communication system, a first electronic communication from a first user, the first electronic communication comprising a plurality of terms;
  searching the plurality of terms for matches to one or more of a plurality of terms of interest;
  identifying in the plurality of terms at least one term of the terms of interest;
  requesting, from a data source, information pertaining to the identified at least one term of interest;
  receiving information responsive to the request;
  creating a first object corresponding to a first of the at least one term of interest, the first object comprising the received information;
  causing presentation of an electronic communication user interface comprising:
    a first textual representation comprising the at least one term of interest, wherein the at least one term of interest is selectable to further present a dialog associated with creation of an object wherein the dialog includes one or more input fields configured to receive information associated with the term of interest;
  creating an updated first object by adding information received via the one or more input fields; and
  providing the first object to a second user computing device, wherein the first object comprises data describing a source of the first electronic communication, a timestamp identifying when the first electronic communication was received, and the at least one term of interest.

13. The method of claim 12, wherein the at least one term of interest is a geographic location.

14. The method of claim 13, further comprising displaying an indication of the geographic location on a map.

15. A non-transitory computer-readable medium storing a set of instructions that are executable by one or more processors to cause the one or more processors to perform a method comprising:
  accessing, from an electronic communication system, a first electronic communication comprising a plurality of terms;
  searching the plurality of terms for matches to one or more of a plurality of terms of interest;
  identifying in the plurality of terms at least one of the terms of interest;
  requesting information pertaining to the identified at least one term of interest;
  receiving information responsive to the request;
  creating a first object corresponding to a first of the at least one term of interest, the first object comprising the received information;
  causing presentation of an electronic communication user interface comprising:
    a first textual representation comprising the at least one term of interest, wherein the at least one term of interest is selectable to further present a dialog associated with creation of the object wherein the dialog includes one or more input fields configured to receive information associated with the term of interest; and
    a second textual representation of a second electronic communication;
  receiving user input via the dialog indicating selection of the first object, the user input further comprising an edited field value for the first object; and
  creating an updated first object by adding the edited field value to the first object; and
  providing the first object to a second user computing device, wherein the first object comprises data describing a source of the first electronic communication, a timestamp identifying when the first electronic communication was received, and the at least one term of interest.

16. The non-transitory computer-readable medium of claim 15, wherein the at least one term of interest is a geographic location.

17. The non-transitory computer-readable medium of claim 16, further comprising instructions executable by the one or more processors to display an indication of the geographic location on a map.

* * * * *